Oct. 26, 1926.
A. E. DRISSNER
1,604,114
TOOL SLIDE MECHANISM
Filed August 13, 1923   3 Sheets-Sheet 1
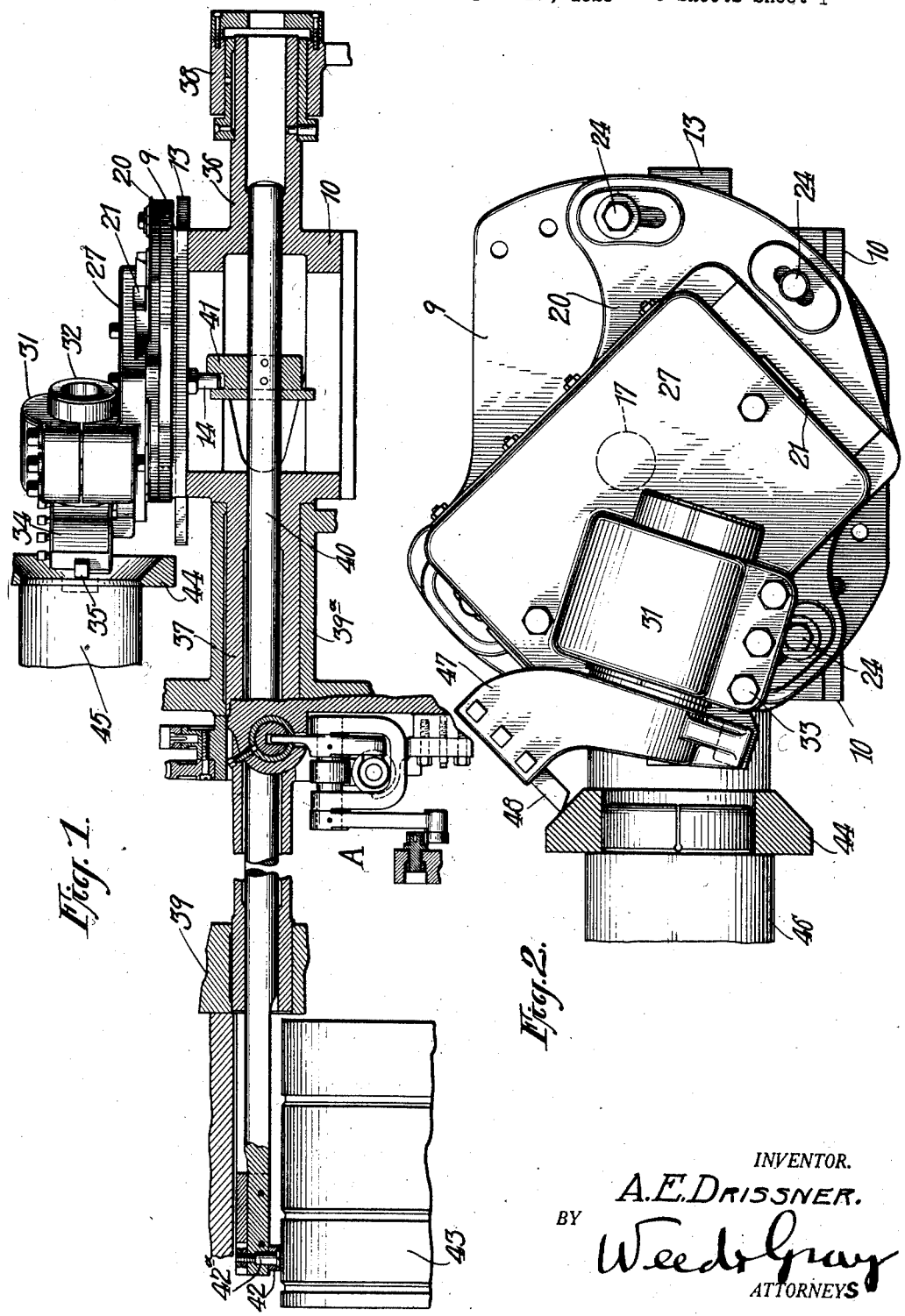
INVENTOR.
A. E. DRISSNER.
BY Weed & Gray
ATTORNEYS

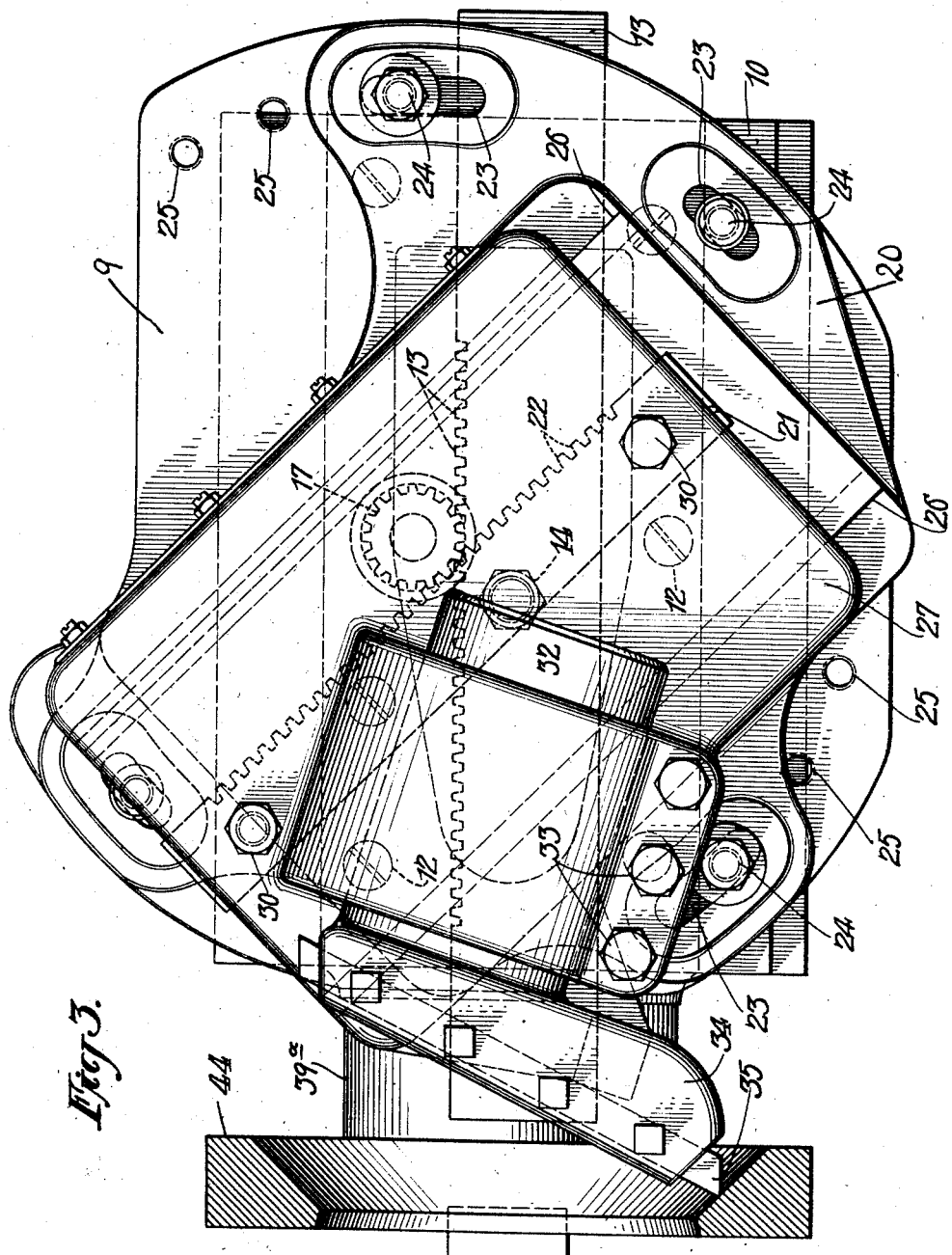

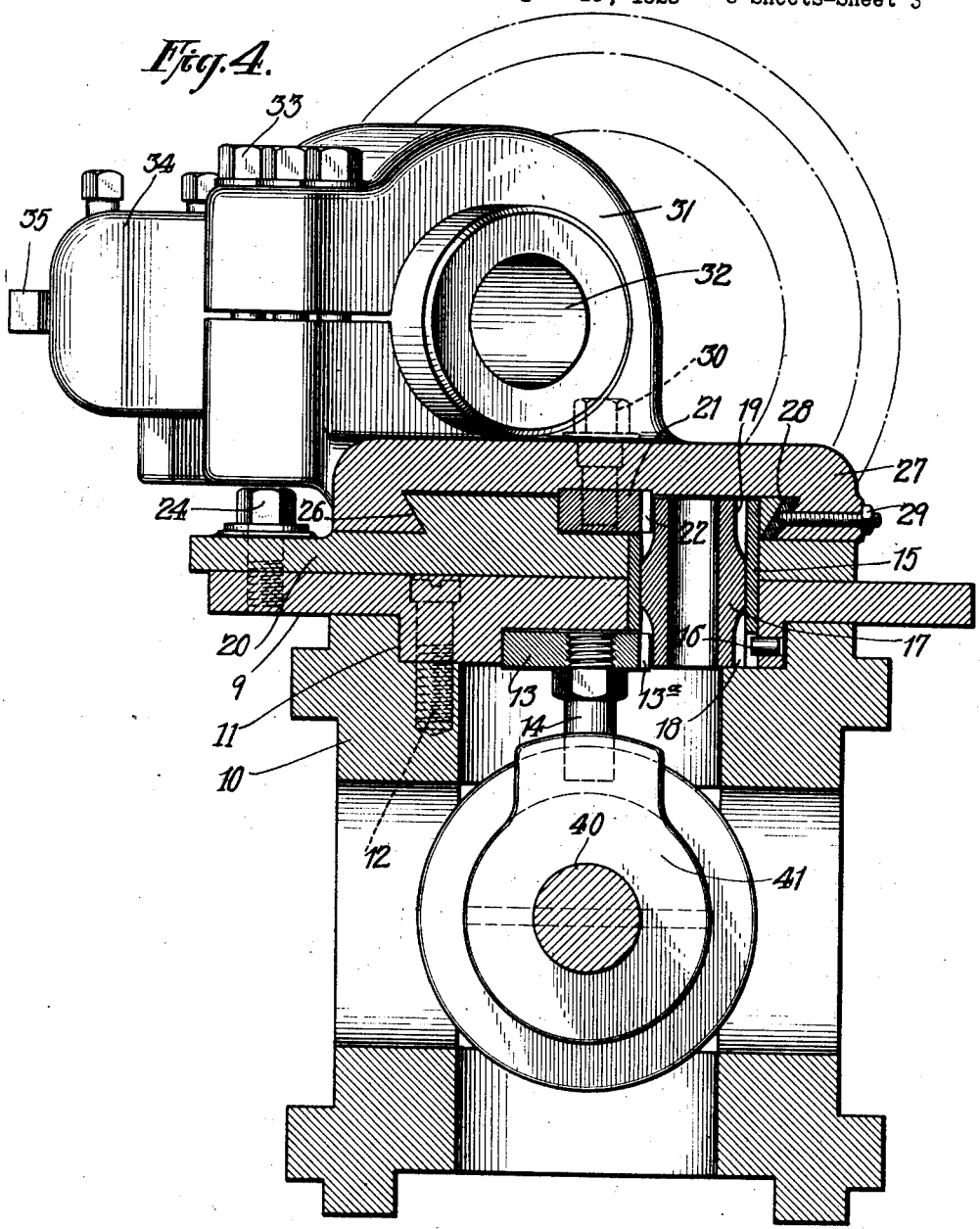

Patented Oct. 26, 1926.

1,604,114

UNITED STATES PATENT OFFICE.

ALFRED E. DRISSNER, OF CLEVELAND, OHIO, ASSIGNOR TO THE NATIONAL ACME COMPANY, OF CLEVELAND, OHIO, A CORPORATION OF OHIO.

TOOL-SLIDE MECHANISM.

Application filed August 13, 1923. Serial No. 657,243.

This invention relates particularly to tool slide mechanism adapted for use in various types of machines, especially metal working machines such as multiple and single spindle automatic screw machines, turret lathes, hand screw machines, etc., an object of the invention being to provide improved mechanism whereby a tool holder, such as a taper boring or turning tool holder may be fed relatively to the work in different adjusted paths so as to permit the same tool holder to be readily utilized for performing various operations on the work.

A further object of this invention is to provide an improved mechanism wherein the tool holder and its tool can be operated for cutting the work at various angles so that an inside or outside taper at any desired angle may be cut in the work merely by adjusting the path of movement of the tool holder and without interfering with the operating mechanism thereof.

A further object of this invention is to provide an improved tool holder and operating mechanism which can be used interchangeably either for outside turning or boring, and which is adjustable for cutting different degrees of taper, for straight boring or for straight outside turning.

A futher object of this invention is to provide an improved tool slide mechanism which can be easily manufactured and assembled, which is adapted to be applied to various types of machines, and which is effective for performing different cutting operations, thereby resulting in reducing the cost of operation, construction, and production.

A further object of this invention is to provide an improved tool holder mechanism especially adapted to be mounted on the tool carrier or turret of a metal working machine, the construction being such that a single single means operating in a constant path is effective to shift the tool holder relatively to the work in different angularly related paths.

Other objects of this invention will appear in the following description and appended claims thereof, reference being had to the accompanying drawings forming a part of this specification wherein like reference characters indicate corresponding parts in the several views and wherein Fig. 1 is a fragmentary sectional view of a part of a machine illustrating my invention as applied thereto; Fig. 2 is a plan view illustrating my invention as utilized for outside turning; Fig. 3 is a plan view illustrating the mechanism as adapted for taper boring; and Fig. 4 is a sectional elevation taken through the turret and illustrating an embodiment of the invention.

Before explaining in detail the present improvement and mode of operation thereof, it is desired to have it understood that the invention is not limited to the details of construction and arrangement of parts which are illustrated in the accompanying drawings, since the invention is capable of other embodiments, and that the phraseology which is employed is for the purpose of description and not of limitation.

The present invention is adapted to be used in connection with various types of machines, and in the present instance by way of example the mechanism is shown as applied to a Gridley single spindle automatic screw machine manufactured by The National Acme Company. In general the construction comprises a pair of supporting members adapted for instance to be mounted on the tool carrier or turret of the machine. One of the supporting members is provided with a slide-way for receiving a tool carrying slide, and is angularly adjustable relatively to the other supporting member so that the tool slide may be shifted in different angularly related paths relatively to the work. The tool slide is adjustable about a suitable pivot gear or pinion. A rack is secured to the tool slide and meshes with the pivot gear in all angular positions of the tool slide. A second rack also meshes with the pivot gear and is shifted by suitable cam operated means in a constant path, so that in operation the tool slide may be shifted in different directions or paths relatively to the work by the same operating means.

In the drawings wherein a present preferred embodiment of my invention is illustrated it will be seen that the mechanism comprises a base or supporting plate 9 constructed so as to extend into a recessed face 11 of the turret 10 and bolted at 12 to the turret. The under face of the base plate 9 is machined lengthwise thereof to receive a gear rack 13 which slides freely therein, the rack 13 having teeth 13ª formed at one side thereof. The rack 13 is tapped so as to receive a downwardly extending stud 14.

A hole of suitable diameter is drilled in the base plate 9 within which extends a bushing 15 which is held from turning by means of a pin 16. Within the bushing 15 is located a pivot gear or pinion 17, the central annular portion of the gear having a bearing against the inner face of the bushing 15. At one side of the central bearing portion of the pivot gear suitable teeth 18 are provided which mesh with the teeth 13ª on the lower rack 13. An adjusting plate 20 is mounted upon the base plate 9 and is drilled to receive the bushing 15 and gear 17, the latter projecting above the top of the base plate 9. The upper part of the pivot gear 17 is also provided with teeth 19 which mesh with teeth 22 on an upper rack 21, the bushing 15 being cut away so as to permit the rack 21 to engage the upper teeth of the pivot gear. The adjusting plate 20 is machined to receive the rack 21 which slides freely therein.

A plurality of slots 23 are machined in the adjusting plate 20 at suitable points and through each of these slots extends a screw 24 which extends into suitable tapped holes 25 in the base plate 9. A series of holes 25 spaced apart at suitable distances are provided for each of the screws 24 so that in adjusting the upper plate 20 on the base plate 9, each screw 24 may be secured in any one of the series of holes 25 provided therefor, and when the several screws are screwed down tightly the plates 20 and 9 will be securely held together in adjusted position.

A dovetail slide-way 26 is machined on the top surface of the adjusting plate 20 and is adapted to receive a dovetail slide 27, an adjusting gib 28 being interposed between the slide and slide-way and secured in position by means of a bolt 29. The upper gear rack 21 is bolted at 30 to the under face of the tool slide 27.

Mounted upon the slide 27 is a tool holder 31. In the present instance the tool holder and slide are cast integrally for the purpose of providing a strong and durable construction adapted for particular classes of work. It will be understood of course that the tool holder which clamps the tool in position may be separate from the slide and suitably secured thereto. The tool holder 31 is suitably drilled and bored to receive the shank 32 of the tool which is clamped thereto by means of bolts 33. In the construction illustrated in Figs. 1, 3 and 4 a boring tool 34 provided with a cutting member 35 is illustrated, and in Fig. 2 a turning tool 47 provided with a cutting member 48 is illustrated in position in the tool holder proper 31.

The tool turret 10 is provided with oppositely extending axial extensions 36 and 37, extension 36 having a suitable bearing in a bracket 38 of the machine frame, and extension 37 having suitable bearings at 39 and 39ª in the machine frame. A drawbar 40 passes through the turret 10 and its rearward extension 37, and extends over the lead cam drum 43 of the machine. This cam drum is mounted upon the cam shaft (not shown) of the machine and is provided with suitable cams (not shown) which engage at predetermined times a roller 42 mounted upon a stud 42ª secured to the rear end of the drawbar 40. Adjacent to the front end of the draw bar 40 and within the housing of the turret is mounted an actuating member 41 which is fixed to the drawbar by suitable pins. The actuator is machined on its outer periphery so as to receive the stud 14 of the lower gear rack 13. In the present instance the turret 10 is constructed at the four faces thereof for receiving suitable tool slide mechanism and the turret is rotatable within its bearings on the machine frame so as to permit the same to be indexed at proper times by the indexing mechanism of the machine.

The indexing and locking mechanism for the turret may be of any suitable construction and in part is generally illustrated at A in Fig. 1. A detailed description of this mechanism and a further detailed description of the cam means for operating the tool slide mechanism is not deemed necessary herein, the construction being shown in my copending application for automatic single spindle or turret lathes, Serial No. 520,287, filed December 6, 1921, now Patent No. 1,567,790, dated December 29, 1925.

In the operation of the present invention it will be understood that rotation of the cam drum 43 by the cam shaft of the machine will cause the cams thereof to shift the drawbar 40 at the proper time. When the stud 14 and the lower gear rack 13 are shifted toward the work 44 which is carried in the revolving work spindle 45 of the machine, the teeth 13ª of the lower gear rack meshing with the lower teeth 18 of the pivot gear 17 will rotate the gear. Since the upper teeth of the gear 17 are in mesh with the upper rack 21, the latter will be shifted toward the work, thus carrying the slide 27, tool holder, and tool, therewith, and causing the tool to operate upon the work. The direction or path of movement of upper rack 21 will be determined by the angular adjustment of adjusting plate 20, the teeth of the upper rack always being in mesh with the pivot gear 17 irrespective of the angular adjustment of the rack and slide. It will be readily seen that the adjusting plate 20 can be turned or rotated about the pivot gear 17 at any angle up to 90° merely by loosening the screws 24 and turning the adjusting plate 20 together with bushing 15 about the bearing thereof on the pivot gear 17. The elongated holes or slots 23 in plate 20 are provided for the purpose of obtaining short or minute angular adjustments, the spaced holes 25 in the lower plate 9 being used initially for approximate adjustment. Thus when the operator sets up the mechanism for the purpose of cutting a taper in the work at a predetermined angle he removes the screws 24 and turns the adjusting plate 20 until he obtains the approximate cutting angle desired, then inserting the screws 24 in the slots so as to extend into the nearest holes 25. Thereupon in order to obtain the exact adjustment the adjusting plate 20 is moved to the correct angle and the screws securely tightened in position.

Where it is desired to cut an outside taper on the work, tool members 47 and 48 are placed in the tool holder as illustrated in Fig. 2, and where taper boring is to be done tool members 34 and 35 are placed in the tool holder 31 as illustrated in Figs. 1, 3 and 4. In either form the tool may be utilized either for straight cutting or for taper cutting depending upon the adjustment of the slide members 20 and 27 with respect to the base plate 9.

It is to be understood that by describing in detail herein any particular form, structure or arrangement, it is not intended to limit the invention beyond the terms of the several claims or the requirements of the prior art.

Having thus explained the nature of this invention and described a way of constructing and using the same, although without attempting to set forth all the forms in which it may be made or all of the modes of its use, I claim:

1. In a metal working machine, the combination of an indexible turret, a tool slide mounted on said turret, means for adjusting said tool slide relatively to the turret to permit the slide to be shifted in different angularly related paths with respect to the turret, mechanism for shifting said tool slide in any of said paths and comprising an operating member extending axially into the turret and reciprocating in a constant path.

2. In a metal working machine, the combination of an indexible turret having means for carrying a plurality of tool slides at different faces thereof, a reciprocating member extending axially into the turret for successively reciprocating said tool slides upon indexing the turret, a rack supported at one face of the turret and adapted to be connected to said reciprocating member, a tool slide, a rack secured to said slide, gear means meshing with said racks and means for adjusting the path of movement of said tool slide relatively to the turret.

3. In a metal working machine, the combination of a work holder, an indexible tool support, means for indexing it, an angularly adjustable tool slide mounted on said tool support, a reciprocating member axially located relative to said tool support, a shiftable rack mounted on said tool support and adapted to reciprocate relative to said support in the direction of said reciprocating member, means connecting said reciprocating member and rack, a rack secured to said tool slide, and gearing connecting said racks for shifting one from the other and thereby the tool slide.

4. In a metal working machine, the combination of an indexible turret, a tool slide carried thereby, a rack secured to said slide, a second rack, a gear having teeth meshing with each rack, an operating member extending into the turret and connected to said second rack, means for angularly adjusting said tool slide and said first rack about the axis of said gear, and means for reciprocating said second rack.

5. In a metal working machine, the combination of a work holder, a tool support located below said work holder and having an opening thereinto, a reciprocating member extending axially into said opening, a rack mounted on said tool support and adapted to reciprocate in the direction of the longitudinal axis thereof, a tool slide mounted on said support, a rack secured thereto, gearing connecting said racks, means for angularly adjusting said tool slide relatively to the tool support and means within said opening for connecting said reciprocating member and said first rack, said means comprising a stud secured to the bottom of the rack and a device carried by said member and cooperating with said stud.

6. In a metal working machine, the combination of an indexible turret, a rotary work holder, a tool slide carried by said turret, a slide member extending axially into said turret, means for connecting said slide member to the tool slide, means for adjusting said tool slide angularly relatively to the turret to permit the tool slide to be shifted in different angular paths, and cam means for reciprocating said slide member.

7. In a metal working machine, the combination of an indexible turret, a rotary work holder, a tool slide carried by said turret, a slide member extending axially into said turret, gear and rack mechanism for connecting said slide member to the tool slide, means for adjusting the path of movement of said tool slide relatively to the turret, and cam means for reciprocating said slide member.

8. In a metal working machine, the combination of an indexible turret, a rotary work holder, a tool slide carried by said turret, a non-rotatable slide bar extending axially into said turret, means for connecting said bar to the tool slide and comprising a rack indexible with the turret and means for releasably connecting the rack to the slide bar, a rack secured to the tool slide, gearing connecting said racks, and cam means for reciprocating said slide bar.

9. In a metal working machine, the combination of a work holder, a hollow tool support having means for mounting a plurality of tools in different horizontal planes around the periphery thereof, a tool slide carried by said support, a rack secured to said slide, a second rack, gearing connecting said racks, means extending into said tool support and engageable with said second rack for shifting the same, means for shifting said means, and means for angularly adjusting said tool slide and its rack about the axis of said gearing to permit the slide to be shifted in different angularly related paths relatively to said support.

10. In a metal working machine, the combination of an indexible turret supported for rotation on a horizontal axis and adapted to simultaneously support tools on its several side faces, an adjusting plate fixed to one of said faces, a tool slide carried by said plate and angularly adjustable relatively thereto, and mechanism including means extending axially of the turret for shifting said tool slide in any of its adjusted positions.

11. In a metal working machine, the combination of an indexible turret supported for rotation on a horizontal axis, a tool slide mounted on said turret, means for adjusting said slide angularly relatively to the axis of rotation of the turret, and means for shifting said slide in its different angularly adjusted paths relatively to the turret and including means extending axially of the turret.

12. In a metal working machine, the combination of an indexible turret supported for rotation on a horizontal axis and adapted to simultaneously support tool slides on its several side faces, an adjusting plate fixed to one of said faces, a tool slide carried by said plate and angularly adjustable relatively thereto, mechanism including gear and rack means and means extending axially of the turret for shifting said tool slide in any of its adjusted positions.

13. In a tool slide mechanism, the combination of an indexible turret supported for rotation on a horizontal axis, a supporting member fixed to said turret and having a slideway, a slide member cooperating with said slideway, a tool carried by said slide member, means for angularly adjusting said members, and means for shifting said slide member in its different angular positions and including means extending axially of the turret.

14. The combination of a non-slidable indexible turret supported for rotation on a horizontal axis, said turret having means for mounting a plurality of tool holders around the periphery thereof, a tool slide mounted on said turret, means for adjusting said slide angularly relatively to the axis of rotation of the turret, and a common means for successively shifting the tool holders on the turret and for shifting said tool slide in its different angularly adjusted paths.

15. The combination of an indexible turret supported for rotation on a horizontal axis, a tool slide mounted on said turret, means for adjusting said slide angularly relatively to the axis of rotation of the turret, and a reciprocating drawbar extending axially into the turret for shifting said slide in its different angularly adjusted paths relatively to the turret.

16. The combination of an indexible turret supported for rotation on a horizontal axis, a tool slide mounted on said turret, means for adjusting said slide angularly relatively to the axis of rotation of the turret, a reciprocating draw-bar extending axially into the turret, and gearing connecting said drawbar and slide for shifting said slide in different angularly adjusted paths relatively to the turret upon reciprocating the drawbar.

17. In a metal working machine, the combination of a work holder, an end working tool support adapted to carry for simultaneous operation a plurality of end working tools, a tool slide carried by said support, means for angularly adjusting said slide to permit the same to be shifted at different angles relatively to said work holder, and means including a rack slidable relatively to said tool support for shifting said slide toward said work holder.

18. In a metal working machine, the combination of an indexible turret supported for rotation on a horizontal axis and having means for carrying tool holders at a plurality of faces thereof, a tool holder carried at one face of the turret, a tool carried by said tool holder, means for adjusting said tool holder for movement relatively to the work in different angularly related paths, and cam means for shifting said tool holder in any of said paths relatively to the tool holder.

19. In a metal working machine, the combination of a work holder, an end working tool support having means for carrying a plurality of end working tool slides, a tool slide carried by said support, means for angularly adjusting said slide to permit the same to be shifted at different angles relatively to said work holder, and means operative to shift all the tool slides carried by said support and to shift said angularly adjustable slide independently of the other tool slides.

20. In a metal working machine, the combination of a work holder, an end working tool support having means for carrying a plurality of end working tool slides, a tool slide, means for angularly adjusting said slide to permit the same to be shifted at different angles relatively to said work holder, and a common means for shifting all of the tool slides carried by the tool support and for independently shifting said angularly adjustable slide.

21. In a metal working machine the combination of an indexible turret supported for rotation on a horizontal axis, work supporting means, a tool slide mounted on said turret, a tool carried by said slide, means for adjusting said tool slide relatively to the turret to permit the same to be shifted in different angularly related paths relatively to the work, mechanism for shifting said tool slide in any of said paths, said mechanism comprising an operating member adapted to reciprocate in a constant path, and cam means for reciprocating said member.

22. The combination of a hollow tool carrier having means for angularly mounting a plurality of tools in different horizontal planes around the periphery, a tool slide mounted on the carrier, means for angularly adjusting the slide, a reciprocating member extending into the tool carrier and means for connecting said member and slide to permit the slide to be shifted in different angular paths.

23. In a metal working machine, the combination of a work holder, an end working tool support having means for carrying a plurality of end working tool slides, a tool slide carried by said support, means for angularly adjusting said slide to permit the same to be shifted at different angles relatively to said work holder, and a common reciprocating means for successively shifting all of the tool slides carried by the tool support and for independently shifting said angularly adjustable slide.

24. In a metal working machine, the combination of a tool support, an angularly adjustable tool carrying slide carried by said support, a rack supported by and shiftable relatively to said tool support, reciprocating means connected to said shiftable rack for shifting it, a rack located above said shiftable rack and carried by said tool slide, and a gear cooperating with both racks for shifting one from the other thereby to shift the tool slide in any of its angularly adjusted positions.

25. In a metal working machine, the combination of an indexible turret, an angularly adjustable tool carrying slide carried by said turret, a rack supported by and shiftable relatively to said turret, reciprocating means connected to said shiftable rack for shifting it, a rack located above said shiftable rack and carried by said tool slide, and a gear cooperating with both racks for shifting one from the other thereby to shift the tool slide in any of its angularly adjusted positions.

26. In a metal working machine, the combination of a work holder, a tool support, an angularly adjustable tool carrying slide carried by said support, means carried by said tool support and shiftable relatively thereto, means cooperating therewith and with the slide for shifting said slide, and means for reciprocating said shiftable means relatively to its tool support in a fixed straight path coinciding with the path of movement of the reciprocating means.

Signed at Cleveland, Ohio, this 7th day of August, 1923.

ALFRED E. DRISSNER.